(12) United States Patent
Roggenkamp et al.

(10) Patent No.: US 8,888,174 B2
(45) Date of Patent: Nov. 18, 2014

(54) PASS-THROUGH ELEMENT FOR A MOTOR VEHICLE FRONT OF DASH SYSTEM

(71) Applicant: GM Global Technology Operations LLC, Detroit, MI (US)

(72) Inventors: Timothy J. Roggenkamp, Brighton, MI (US); Alan V. Parrett, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/793,243

(22) Filed: Mar. 11, 2013

(65) Prior Publication Data

US 2014/0252792 A1 Sep. 11, 2014

(51) Int. Cl.
*B62D 25/14* (2006.01)
*F01N 13/00* (2010.01)
*B62D 25/08* (2006.01)

(52) U.S. Cl.
CPC ............. *B62D 25/081* (2013.01); *F01N 13/00* (2013.01)
USPC ............................................ 296/208; 296/70

(58) Field of Classification Search
CPC .. B60K 37/00; B60K 37/04; B60K 2350/941; B60K 2350/401; B60K 20/08
USPC ............... 296/70, 187, 72, 39.3, 208, 187.02; 181/204
See application file for complete search history.

(56) References Cited

U.S. PATENT DOCUMENTS 6,981,737 B2 * 1/2006 Welsh ............................ 296/208
7,658,263 B2 * 2/2010 Jasnie et al. ................... 181/204

* cited by examiner

*Primary Examiner* — Joseph D Pape
*Assistant Examiner* — Dana Ivey
(74) *Attorney, Agent, or Firm* — Cantor Colburn LLP

(57) ABSTRACT

A pass-through element for a motor vehicle front of dash panel system includes a body portion having an outer edge that surrounds a central web. A conductor pass-through member is provided in the central web, and a sound enhancing element provided in the central web alongside the conductor pass-through member. The sound enhancing element is configured and disposed to condition and conduct motor vehicle engine sound from an engine compartment to a passenger compartment through the motor vehicle front of dash system.

18 Claims, 5 Drawing Sheets

PASS-THROUGH ELEMENT FOR A MOTOR VEHICLE FRONT OF DASH SYSTEM

FIELD OF THE INVENTION

The subject invention relates to the art of motor vehicles and, more particularly, to a pass-through element for a motor vehicle front of dash system.

BACKGROUND

Most motor vehicles include an engine compartment that houses a power plant such as an internal combustion engine, a passenger compartment, and a storage compartment or trunk. Generally, a front of dash system is provided between the engine compartment and the passenger compartment. The front of dash system provides a shield between the power plant and the passenger compartment. In many cases, the front of dash system includes a front of dash panel with various pass-throughs that accommodate mechanical linkages and electrical conductors. The mechanical linkages may include brake linkages, clutch linkages, accelerator linkages and the like. Electrical conductors provide a connection between various instrument panel gauges, ignition controls, switches and the like, and the power plant, transmission and other components in the engine compartment.

In some cases, front of dash systems accommodate sound enhancers that condition sound created by the power plant entering the passenger compartment. Typically, the sound enhancers tap into an induction system portion of the power plant. A band pass filter conditions sound output from the induction system to provide passengers with distinct and desirable sound. In some cases, vehicles that include a sound enhancer require that the front of dash panel include an additional pass-through or opening. As not all vehicles include a sound enhancer, manufacturers are required to either produce two front of dash panel models, or a single front of dash panel model that includes an additional opening and provide a plug that would close off the additional opening for vehicles that do not include a sound enhancer. Manufacturing and warehousing multiple panel models and plugs is costly. Accordingly, it is desirable to provide a front of dash panel that can accommodate a sound enhancer without requiring an additional opening and a designated plug.

SUMMARY OF THE INVENTION

In accordance with an exemplary embodiment, a pass-through element for a motor vehicle front of dash system includes a body portion having an outer edge that surrounds a central web. A conductor pass-through member is provided in the central web, and a sound enhancing element is provided in the central web alongside the conductor pass-through member. The sound enhancing element is configured and disposed to conduct motor vehicle engine sound from an engine compartment to a passenger compartment through the motor vehicle front of dash system.

In accordance with another exemplary embodiment, a motor vehicle includes a body, an engine compartment, and a passenger compartment. The engine compartment includes a sound enhancer. A motor vehicle front of dash system separates the engine compartment from the passenger compartment. The front of dash system includes a front of dash panel having one or more openings. A pass-through element is arranged in one of the one or more openings in the front of dash panel and operatively connected to the sound enhancer. The pass-through element includes a body portion having an outer edge that surrounds a central web, a conductor pass-through member provided in the central web, and a sound enhancing element provided in the central web alongside the conductor pass through member. The sound enhancing element is configured and disposed to conduct motor vehicle engine sound from the engine compartment to the passenger compartment through the motor vehicle front of dash system.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
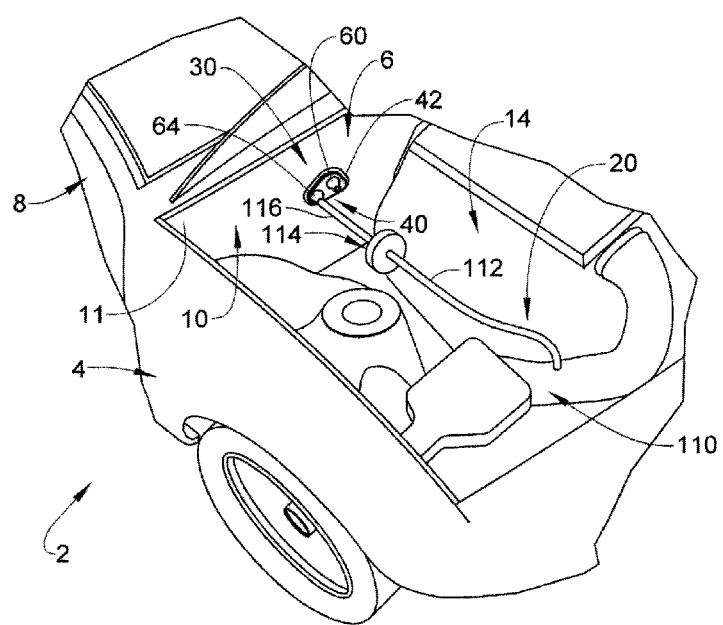
FIG. 1 is a partial perspective view of a motor vehicle including a front of dash system including a front of dash panel having a pass-through element having a sound enhancement element in accordance with an exemplary embodiment.
Figure 2:
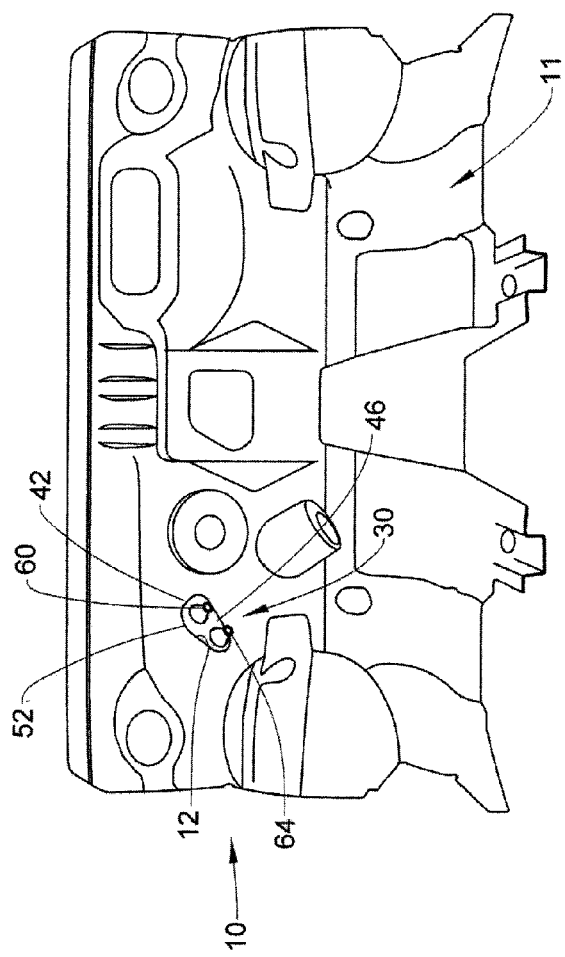
FIG. 2 is a plan view of a front of dash panel including the pass-through element in accordance with an exemplary embodiment.

A motor vehicle, in accordance with an exemplary embodiment, is indicated generally at 2 in FIG. 1. Motor vehicle 2 includes a body 4, an engine compartment 6 and a passenger compartment 8. A front of dash system 10 separates engine compartment 6 from passenger compartment 8. Front of dash system 10 includes a front of dash panel 11 and a plurality of openings, one of which is indicated at 12 in FIG. 2. Front of dash pane 11 serves as a barrier, while openings 12 act as a pass-through for various components that extend between the engine compartment 6 and passenger compartment 8. Engine compartment 6 houses an engine 14 that provides motive energy for motor vehicle 2. Engine compartment 6 includes a sound enhancer 20 that delivers engine sound to passenger compartment 8 to enhance a driver's overall perception of motor vehicle 2. More specifically, sound enhancer 20 delivers desirable acoustics or sounds and reduces the input of undesirable acoustics or noise. The following description is merely exemplary in nature and is not intended to limit the present disclosure, its application or uses. It should be understood that throughout the drawings, corresponding reference numerals indicate like or corresponding parts and features.

Figure 3:
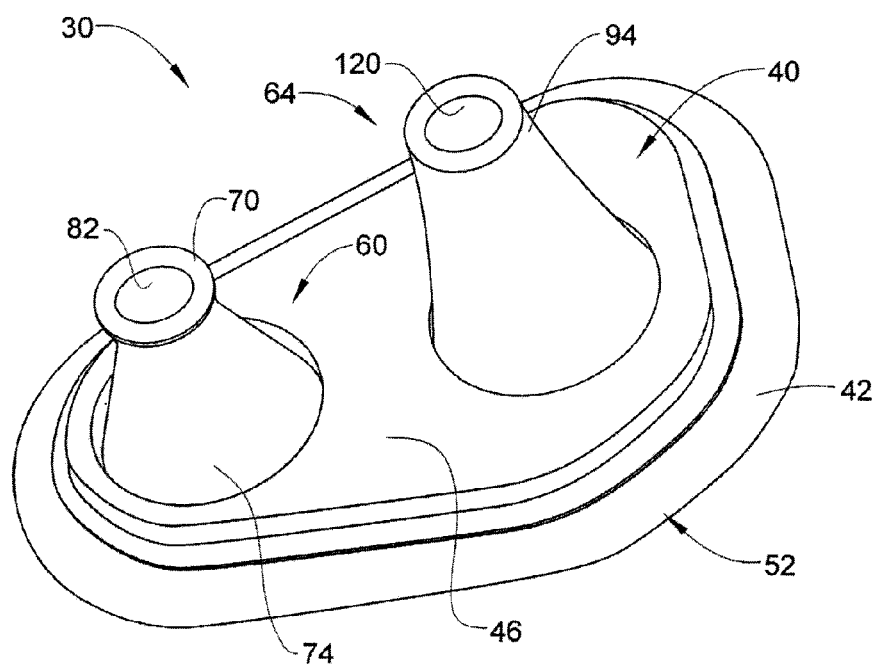
FIG. 3 is a perspective view of the pass-through element of FIG. 1.
Figure 4:
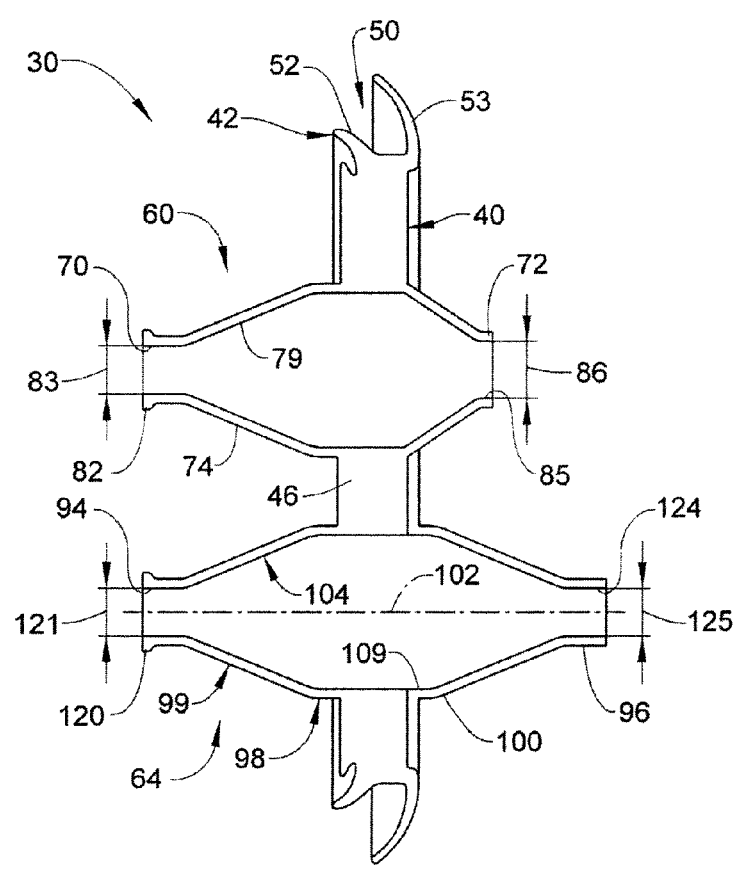
FIG. 4 is a cross-sectional side plan view of the pass-through element of FIG. 2.

In accordance with an exemplary embodiment, motor vehicle 2 includes a pass-through element 30 that provides a passage for one or more conductors (not shown) that extend between engine compartment 6 and passenger compartment 8, and also delivers engine sound, as will be discussed more fully below. At this point it should be understood that the term "conductors" should be construed to include electrical conductors, fluid conductors, and mechanical conductors or linkages. As shown in FIGS. 3, and 4, pass-through element 30 includes a body portion 40 having an outer edge 42 that defines a central web 46. Outer edge 42 includes a groove 50 that defines first and second flange elements 52 and 53. Flange element 52 grips an edge (not separately labeled) defining opening 12 and flange element 53 grips an edge (not shown) of an interior acoustic insulator or dash mat (also not shown). Pass-through element 30 also includes a conductor pass-through member 60 and a sound enhancement element 64.

In accordance with an aspect of an exemplary embodiment, conductor pass-through member 60 includes a first end section 70 that extends from central web 46 in a first direction to a second end section 72 through an intermediate section 74. Second end section 72 extends from central web 46 in a second direction that is generally opposite the first direction. Intermediate section 74 includes a tapered wall section 79. First end section 70 includes a first opening 82 having a first dimension 83 and second end section 72 includes a second opening 85 having a second dimension 86. In the exemplary aspect shown, second dimension 86 is substantially similar to first dimension 83. In this manner, first and second end sections 70 and 72 can seal about a conductor (not shown) passing through conductor pass-through member 60.

In further accordance with an exemplary embodiment, sound enhancement element 64 includes a first end 94 that extends to a second end 96 through an intermediate portion 98. First end 94 includes a first contoured surface 99 and extends from central web 46 in a first direction, and second end 96 includes a second contoured surface 100 and extends from central web 46 in a second, substantially opposite direction. Second contoured surface 100 may be shaped for acoustical tuning to be substantially similar to, or dissimilar from, first contoured surface 99. In accordance with an aspect of the exemplary embodiment, first and second ends 94 and 96 extend along a common axis 102. However, it should be understood that first end 94 may be off-set from second end 96.

In still further accordance with an exemplary embodiment, intermediate portion 98 includes an inner contoured surface 104. In accordance with an aspect of the exemplary embodiment, inner contoured surface 104 includes a complex curvilinear profile defined by first and second contoured surfaces 99 and 100. Inner contoured surface 104 forms an acoustically tuned element 109. Acoustically tuned element 109 acts as an acoustic or band pass filter that delivers a portion of the engine sound passing through sound enhancer 20. Specifically, engine acoustic waves pass from an intake 110 of engine 14 through a first conduit 112. First conduit 112 extends between intake 110 and a mechanical sound enhancement diaphragm 114. A second conduit 116 extends between mechanical sound enhancement diaphragm 114 and first end 94 of sound enhancement element 64. Engine sound passes into first end 94 through a first opening 120 having a first dimension 121. The sound from sound enhancer 20 passes through sound enhancement element 64 and is filtered by acoustically tuned element 109 before passing through a second opening 124 arranged at second end 96. Second opening 124 includes a second dimension 125 that may be generally similar to first dimension 121. However, it should be understood that second dimension 125 may also be dissimilar to first dimension 121. For example, second dimension 125 may be larger than first dimension 121. Also, second dimension 125 may be smaller than first dimension 121. The relative sizes of first and second dimensions 121 and 125 may vary depending upon desired acoustic tuning and/or acoustic output.

Figure 5:
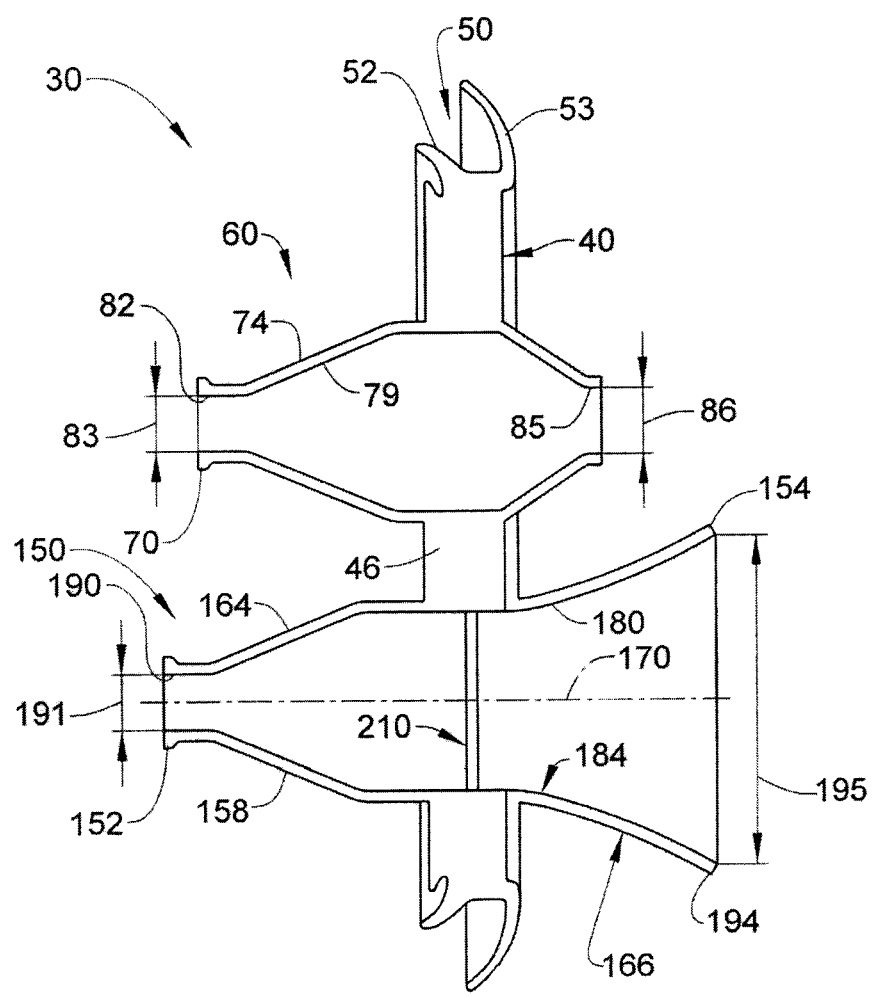
FIG. 5 is a cross-sectional side view of a pass-through element including a sound enhancement element in accordance with another aspect of the exemplary embodiment.

Reference will now follow to FIG. 5, wherein like reference numbers represent corresponding parts in the respective views, in describing a sound enhancement element 150 in accordance with another aspect of the exemplary embodiment. Sound enhancement element 150 includes a first end 152 that extends to a second end 154 through an intermediate portion 158. First end 152 includes a first contoured surface 164 and extends from central web 46 in a first direction and second end 154 includes a second contoured surface 166 and extends from central web 46 in a second, substantially opposite direction. Second contoured surface 166 flares outward from central web 46. In accordance with an aspect of the exemplary embodiment, first and second ends 152 and 154 extend along a common axis 170. However, it should be understood that first end 152 may be off-set relative to second end 154.

In still further accordance with an exemplary embodiment, intermediate portion 158 includes an inner contoured surface 180. In accordance with an aspect of the exemplary embodiment, inner contoured surface 180 includes a complex curvilinear profile defined by first and second contoured surfaces 164 and 166. Inner contoured surface 180 forms an acoustically tuned element 184. Acoustically tuned element 184 acts as an acoustic filter that conditions engine sound passing through sound enhancer 20. Specifically, engine acoustic waves pass into first end 152 through a first opening 190 having a first dimension 191. The engine acoustic waves pass through sound enhancement element 150 and are shaped by acoustically tuned element 184 before passing through a second opening 194 arranged at second end 154. Second opening 194 includes a second dimension 195 that is generally larger than first dimension 191. In accordance with an aspect of the exemplary embodiment, sound enhancement element 150 includes an optional diaphragm 210 typically located at central web 46. Of course, it should be understood that diaphragm 210 could be located at other positions within sound enhancement element 150. Diaphragm 210 provides additional sound enhancement and may act as an attenuation device that further conditions sound passing through sound enhancement element 150. While shown in connection with sound enhancement element 150, sound enhancement element 64 may also include a diaphragm (not shown).

At this point it should be understood that the exemplary embodiments describe a pass-through element that not only accommodates conductors that extend through a front of dash system arranged between an engine compartment and a passenger compartment, but also supports a sound enhancement element. The sound enhancement element may be shaped to further condition the sound produced by the engine and transmitted to the passenger compartment. The shape may vary depending on vehicle type and desired engine sound in the passenger compartment. In addition, the sound enhancement element may include a diaphragm that provides additional sound management. The pass-through element allows for a single style of front of dash panel to be formed for a particular model motor vehicle. Specifically, the pass-through element can accommodate vehicle types that include sound enhancer and vehicle types that do not include a sound enhancer. In the latter case, the sound enhancement element may be plugged or a simple pass-through installed in the front of dash panel. It should also be understood that while the sound is described as being produced by the engine, the sound enhancer may also contribute to sound production. Sound production may also stem from other components in the engine compartment.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A pass-through element for a motor vehicle front of dash system comprising:
   a body portion having an outer edge that surrounds a central web;
   a conductor pass-through member provided in the central web; and
   a sound enhancement element provided in the central web adjacent the conductor pass-through member, the sound enhancement element extending from a first end projecting from the central web in a first direction to a second end projecting from the central web in a second direction that is distinct from the first direction through an intermediate portion having a contoured surface, the sound enhancement element being configured and disposed to condition and conduct motor vehicle engine sound from an engine compartment to a passenger compartment through the motor vehicle front of dash system.

2. The pass-through element according to claim 1, wherein the sound enhancement element includes a first end projecting from the central web in a first direction and a second end projecting from the central web in a second direction that is distinct from the first direction.

3. The pass-through element according to claim 2, wherein the first and second directions extend along a common axis.

4. The pass-through element according to claim 1, wherein the contoured surface defines an acoustically tuned element.

5. The pass-through element according to claim 4, wherein the acoustically tuned element defines an acoustic filter.

6. The pass-through element according to claim 1, wherein the first end includes a first opening having a first dimension and the second end includes a second opening having a second dimension that is substantially similar to the first dimension.

7. The pass-through element according to claim 1, wherein the contoured surface comprises a complex curvilinear profile.

8. The pass-through element according to claim 1, wherein the outer edge includes a groove that defines first and second flange elements.

9. The pass-through element according to claim 1, wherein the conductor pass-through member and the sound enhancement element are materially integrally formed with the central web.

10. The pass-through element according to claim 1 further comprising: a diaphragm arranged in the sound enhancement element, the diaphragm being configured and disposed to tune motor vehicle engine sound passing from the engine compartment to the passenger compartment.

11. A motor vehicle comprising:
   a body including an engine compartment, and a passenger compartment, the engine compartment including a sound enhancer;
   a motor vehicle front of dash system separating the engine compartment from the passenger compartment, the front of dash panel including one or more openings; and
   a pass-through element arranged in one of the one or more openings in the front of dash system, the pass-through element comprising:
      a body portion having an outer edge that surrounds a central web;
      a conductor pass-through member provided in the central web; and
      a sound enhancement element provided in the central web adjacent the conductor pass-through member, the sound enhancement element extending from a first end projecting from the central web in a first direction to a second end projecting from the central web in a second direction that is distinct from the first direction through an intermediate portion having a contoured surface and being coupled to the sound enhancer, the sound enhancement element being configured and disposed to condition and conduct motor vehicle engine sound from an engine compartment to a passenger compartment through the motor vehicle front of dash system.

12. The motor vehicle according to claim 11, wherein the sound enhancement element includes a first end projecting from the central web in a first direction and a second end projecting from the central web in a second direction that is distinct from the first direction.

13. The motor vehicle according to claim 11, wherein in contoured surface defines an acoustically tuned element.

14. The motor vehicle according to claim 13, wherein the acoustically tuned element defines an acoustic filter.

15. The motor vehicle according to claim 11, wherein first end includes a first opening having a first dimension and the second end includes a second opening having a second dimension that is substantially similar to the first dimension.

16. The motor vehicle according to claim 15, wherein the second dimension is larger than the first dimension.

17. The motor vehicle according to claim 11, wherein the outer edge includes a groove that defines first and second flange elements.

18. The motor vehicle according to claim 11, further comprising: a diaphragm arranged in the sound enhancement element, the diaphragm being configured and disposed to tune motor vehicle engine sound passing from the engine compartment to the passenger compartment.

* * * * *